(12) United States Patent
Frisky et al.

(10) Patent No.: US 11,389,750 B2
(45) Date of Patent: Jul. 19, 2022

(54) PRESSURIZED ELECTRO-SEPARATION SYSTEM

(71) Applicant: Ground Effects Environmental Services Inc., Regina (CA)

(72) Inventors: Sean Frisky, Regina (CA); Jason Beaudin, Regina (CA); Justin Lee, Regina (CA)

(73) Assignee: Ground Effects Environmental Services Inc., Regina (CA)

( * ) Notice: Subject to any disclaimer, the term of this patent is extended or adjusted under 35 U.S.C. 154(b) by 1016 days.

(21) Appl. No.: 15/857,181

(22) Filed: Dec. 28, 2017

(65) Prior Publication Data

US 2019/0201813 A1 Jul. 4, 2019

(51) Int. Cl.

| | |
|---|---|
| *B01D 17/06* | (2006.01) |
| *B01D 17/12* | (2006.01) |
| *B03B 1/00* | (2006.01) |
| *B01D 17/02* | (2006.01) |
| *B03C 5/02* | (2006.01) |

(52) U.S. Cl.
CPC ......... *B01D 17/06* (2013.01); *B01D 17/0217* (2013.01); *B01D 17/12* (2013.01); *B03B 1/00* (2013.01); *B03C 5/026* (2013.01)

(58) Field of Classification Search
CPC .... B01D 17/06; B01D 17/12; B01D 17/0217; B03B 1/00; B03C 5/026
See application file for complete search history.

(56) References Cited

U.S. PATENT DOCUMENTS

| | | | | |
|---|---|---|---|---|
| 3,926,774 | A * | 12/1975 | Watson ................. | B01D 17/06 204/667 |
| 2014/0332385 | A1 | 11/2014 | Frisky et al. | |
| 2015/0283554 | A9 | 10/2015 | Frisky et al. | |
| 2018/0080294 | A1 | 3/2018 | Frisky et al. | |
| 2019/0023589 | A1* | 1/2019 | Norman ................. | C02F 1/004 |

\* cited by examiner

*Primary Examiner* — Walter D. Griffin
*Assistant Examiner* — Cameron J Allen
(74) *Attorney, Agent, or Firm* — Standley Law Group LLP; Stephen L. Grant; Kenny W. Pung

(57) ABSTRACT

A treatment system for treating a liquid containing contaminants is provided. The system can include a separation apparatus, an oxidation reactor and a power supply. The separation apparatus can include: a housing capable of maintaining a pressure of 50 psi or greater in an interior space; an inlet; an outlet; and an electrode assembly provided in the housing. The oxidation reactor can include: a housing defining an interior space; an inlet oriented to induce swirling in an incoming flow of liquid in the interior space of the housing, the inlet connected to the outlet of the separation apparatus; an ozone port leading into the housing; an outlet; and a conduit connected at a bottom end to the outlet and extending vertically in the housing to an opening at a top end. The power supply operative to supply a voltage to the first and second electrical conductors of the separation apparatus.

4 Claims, 16 Drawing Sheets

PRESSURIZED ELECTRO-SEPARATION SYSTEM

The present invention relates to an electro-separation system and more particularly to a pressurized electro-separation apparatus, a cyclonic reactor and system incorporating them.

SUMMARY

In one aspect, a separation apparatus is provided. The separation apparatus can include: a housing capable of withstanding pressures of 50 psi or greater and defining an interior space; a sealable lid operative to maintain a pressure of 50 psi or greater in the housing when the lid is sealed to the housing; a first electrical conductor; a second electrical conductor; an inlet operative to allow liquid to be introduced into the housing; an outlet operative to allow liquid to be discharged from the housing; and an electrode assembly provided in the housing. The electrode assembly can include: a plurality of parallel-spaced electrode plates, each electrode plate formed from an electrically conductive material; a first bus bar operatively connected by the first electrical conductor to a first set of the electrode plates; and a second bus bar operatively connected by the second electrical conductor to a second set of the electrode plates. The first set of electrode plates alternate with the second set of electrode plates in the plurality of electrode plates so that adjacent electrode plates for an anode cathode pair.

In a further aspect, an autowash assembly is provided in the housing of the separation apparatus below the electrode assembly.

In a second aspect, method is provided. The method can include: providing a separation apparatus comprising: a housing capable of withstanding pressures of 50 psi or greater and defining an interior space; and an electrode assembly provided in the interior space, the electrode assembly having a plurality of electrode plates; routing liquid containing contaminants into the interior space of the housing of the separation apparatus; increasing the pressure in the interior space of the housing to 50 psi or greater and supplying a voltage across adjacent electrode plates; and supplying the voltage for a period of time while maintaining the pressure in the liquid above 50 psi to allow the contaminants in the liquid to destablize.

In a third aspect, an oxidation reactor is provided. The oxidation reactor can include: a housing extending vertically along a central axis and defining an interior space; an inlet provided proximate a bottom of the housing, the inlet passing into the interior space of the housing and oriented to create an incoming flow of liquid in the interior space of the housing that is substantially horizontal in direction and directed to one side of the central axis; at least one ozone port leading into the housing; an outlet provided proximate a bottom of the housing; and a conduit extending vertically in the housing, the conduit having a bottom end connected to the outlet and a top end having an opening.

In a fourth aspect, a treatment system for treating a liquid containing contaminants is provided. The system can include a separation apparatus, an oxidation reactor and a power supply. The separation apparatus can include: a housing capable of withstanding pressures of 50 psi or greater and defining an interior space; a sealable lid operative to maintain a pressure of 50 psi or greater in the housing when the lid is sealed to the housing; a first electrical conductor; a second electrical conductor; an inlet operative to allow liquid to be introduced into the housing; an outlet operative to allow liquid to be discharged from the housing; and an electrode assembly provided in the housing, the electrode assembly comprising: a plurality of parallel-spaced electrode plates, each electrode plate formed from an electrically conductive material; a first bus bar operatively connected by the first electrical conductor to a first set of the electrode plates; and a second bus bar operatively connected by the second electrical conductor to a second set of the electrode plates, wherein the first set of electrode plates alternate with the second set of electrode plates in the plurality of electrode plates so that adjacent electrode plates for an anode/cathode pair. The oxidation reactor can include: a housing extending vertically along a central axis and defining an interior space; an inlet provided proximate a bottom of the housing, the inlet passing into the interior space of the housing and oriented to create an incoming flow of liquid in the interior space of the housing that is substantially horizontal in direction and directed to one side of the central axis, the inlet operatively connected to the outlet of the separation apparatus; at least one ozone port leading into the housing; an outlet provided proximate a bottom of the housing; and a conduit extending vertically in the housing, the conduit having a bottom end connected to the outlet and a top end having an opening. The power supply connected to the first electrical conductor and the second electrical conductor and operative to supply a voltage to the first electrical conductor and the second electrical conductor of the separation apparatus.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
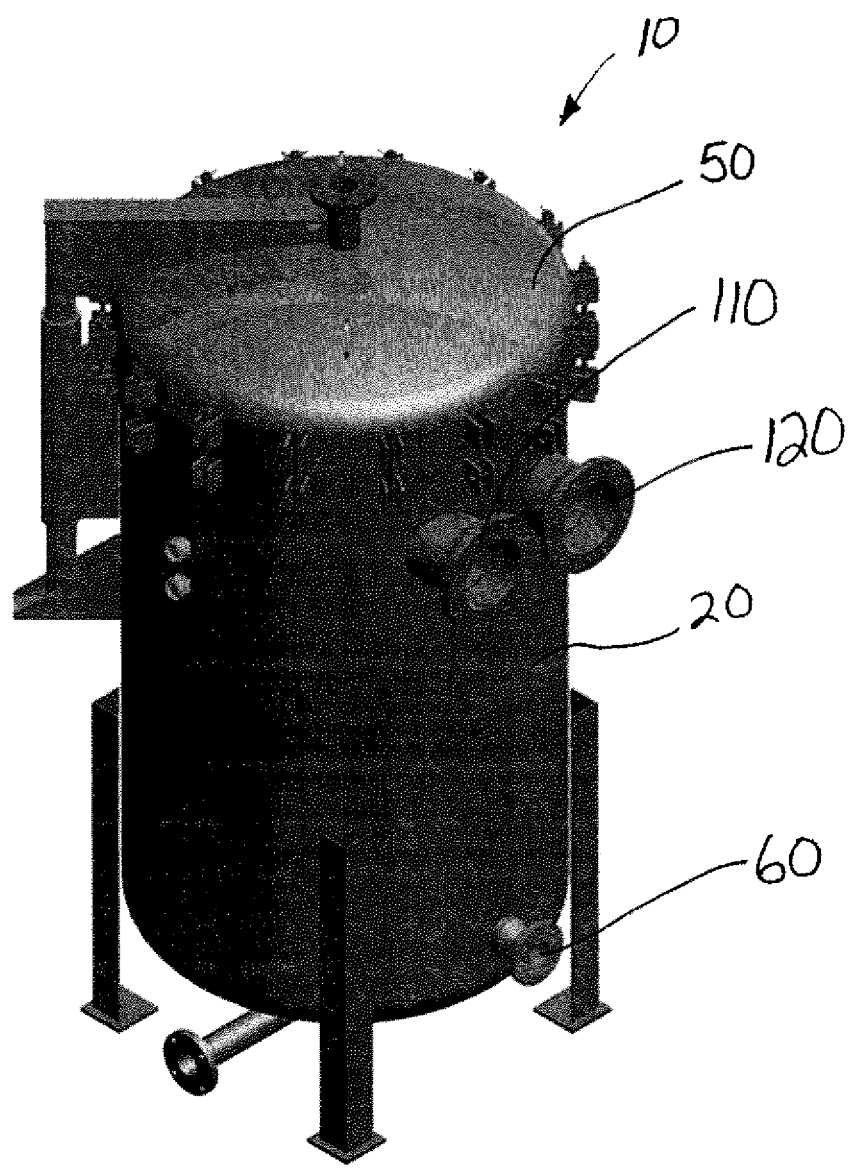
FIG. 1 is a perspective view of an electro-separation apparatus.
Figure 2:
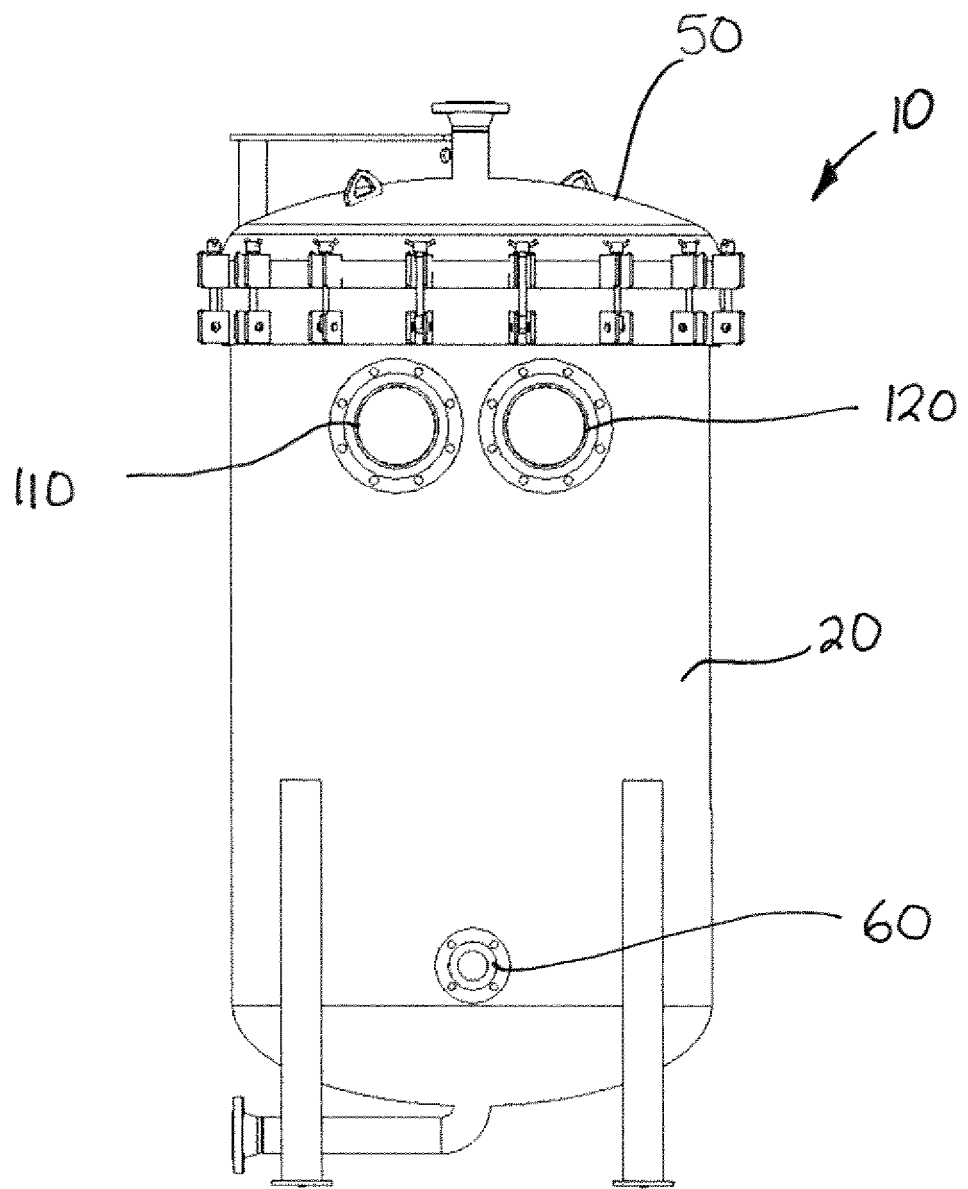
FIG. 2 is a front view of the electro-separation apparatus of FIG. 1.
Figure 3:
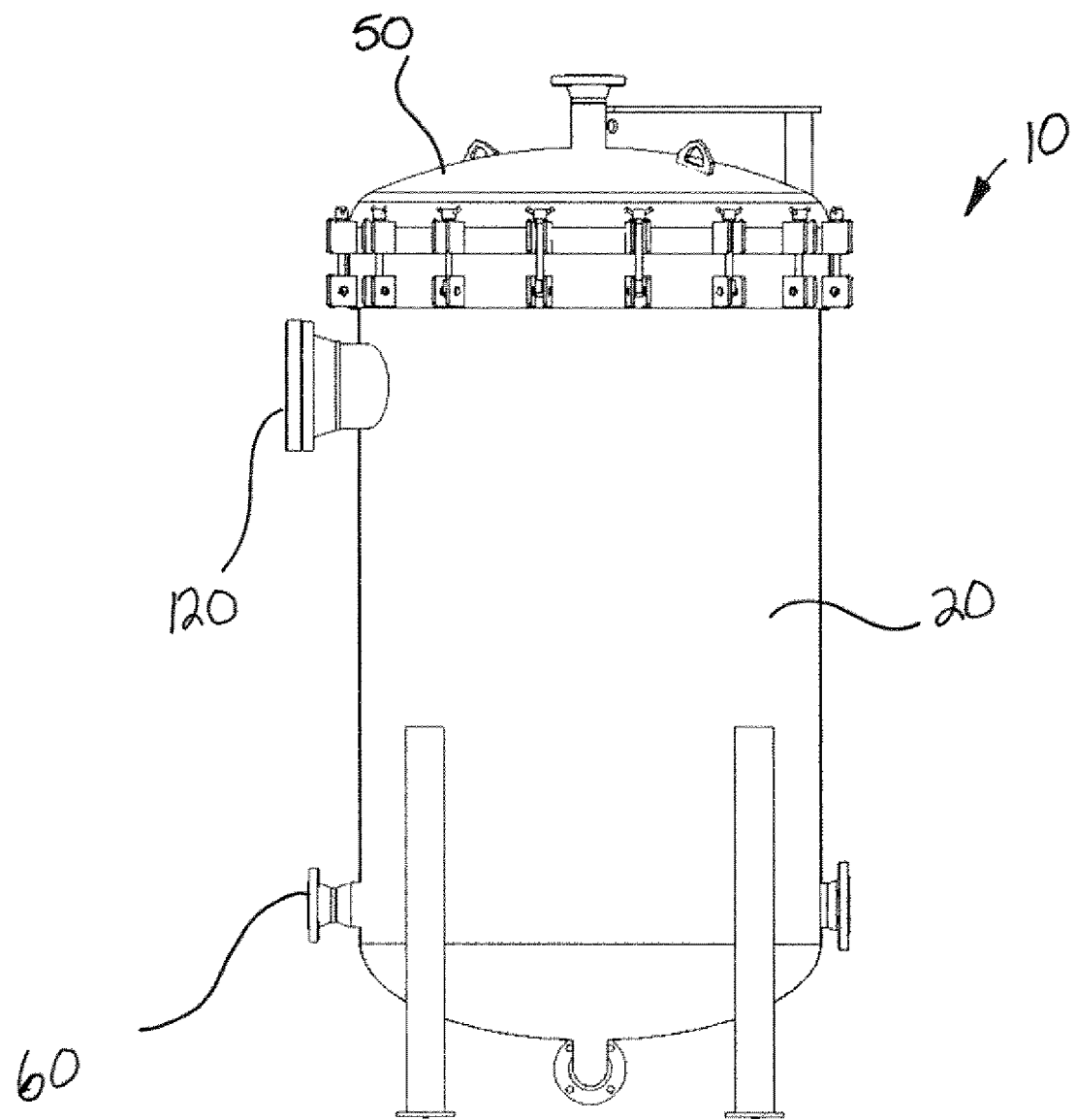
FIG. 3 is a side view of the electro-separation apparatus of FIG. 1.

FIGS. 1-3 illustrate a pressurized separation apparatus 10 for removing contaminants from wash fluid, slop fluid, water based drilling fluid or any other oilfield, industrial type liquid. The separation apparatus 10 can include a housing 20, a lid 50, a first electric conductor inlet 110, a second electric conductor inlet 120, an inlet 60 and an outlet 70.

The sealable lid 50 can be sized to completely cover the housing 20 so that the interior of the housing 20 is hermetically sealed and the housing 20 can form a water and pressure-tight enclosure with the lid 50 so that the lid 50 can maintain a seal with the housing 20 when the pressure in the housing 20 is increased significantly over atmospheric pressure.

Figure 4:
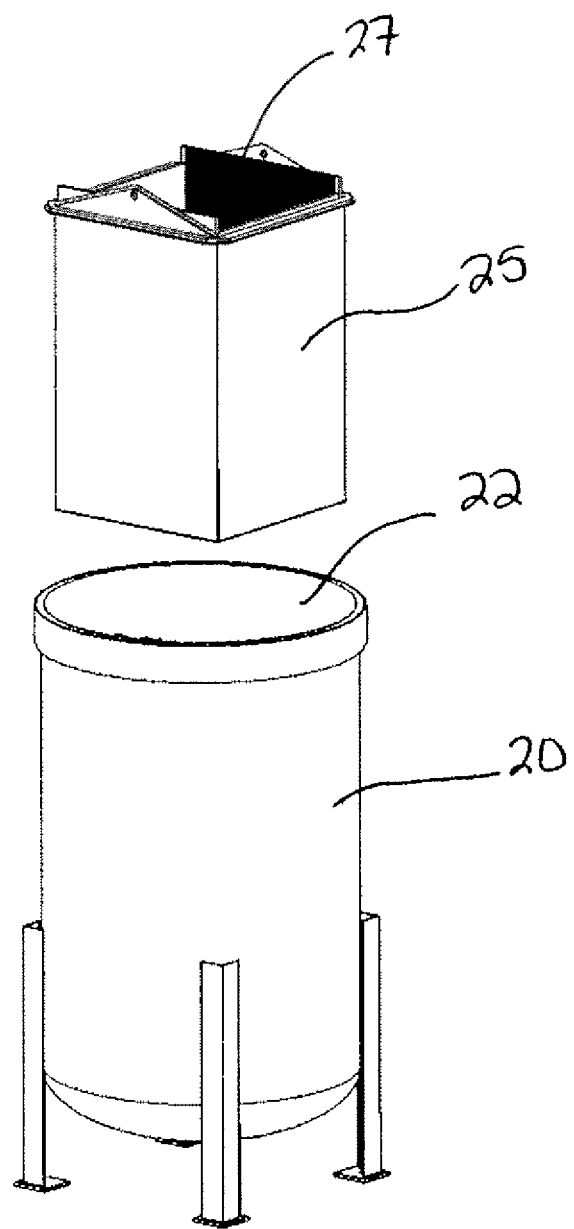
FIG. 4 is a perspective view of a housing and insert of the electro-separation apparatus of FIG. 1.
Figure 5:
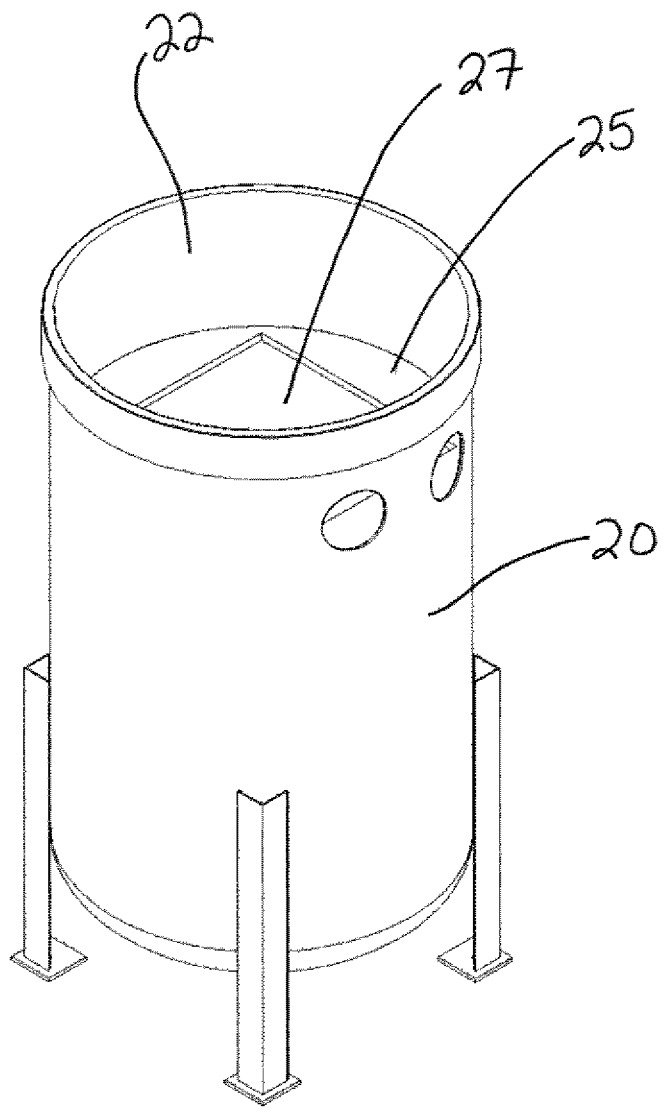
FIG. 5 is a perspective view of the housing of FIG. 4 with the insert installed in the housing.

Referring to FIGS. 4 and 5, the housing 20 can define an interior space 22 and an insert 25 can be provided that fits within the housing 20 to form a smaller rectangular space 27 sized to fit an electrode assembly 150.

Figure 6:
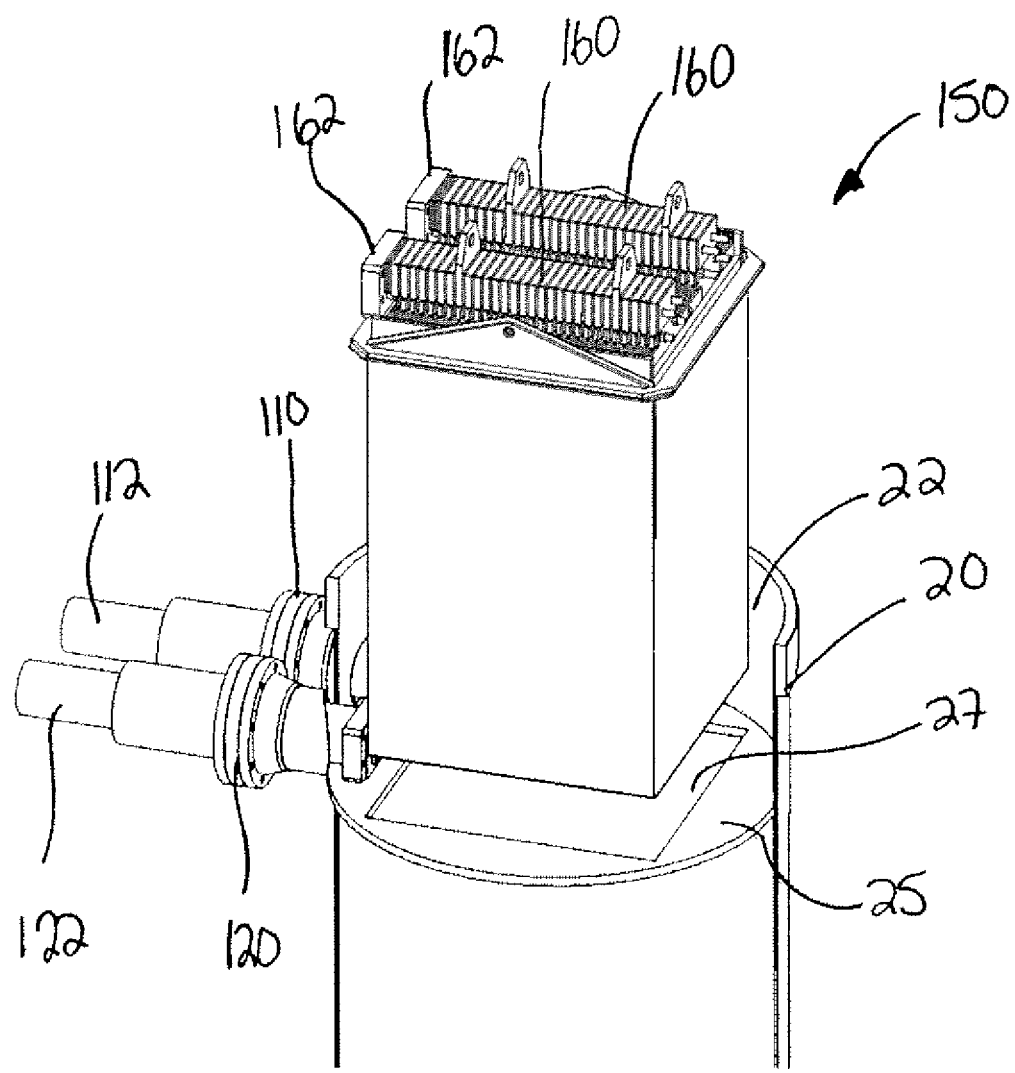
FIG. 6 is a exploded perspective view of an electrode assembly and the housing.

FIG. 6 illustrates the electrode assembly 150. The electrode assembly 150 can have a series of parallel-spaced electrode plates 152 connectable by a first and second bus bars 160 to a first electric conductor 112 and a second electric conductor 122. In one aspect, each electric conductor 112, 122 can have a 6" diameter and be made of solid copper. In other aspects, the first electric conductor 112 and a second electric conductor 122 can have a diameter of 5" or greater. In one aspect, this diameter is adjusted based on the capacity of the system and required current density per volume the system. The electrodes plates 152 can be installed in the rectangular space 27 created by the insert 25 inside the housing 20.

The first electrical conductor inlet 110 can form a water tight and pressure tight seal around the first electrical conductor 112 where it enters the housing 20 to maintain an elevated pressure inside the interior space 22 of the housing 20. The second electrical conductor inlet 120 can form a water tight and pressure tight seal around the second electrical conductor 122 where it enters the housing 20 to maintain an elevated pressure inside the interior space 22 of the housing 20.

Figure 7:
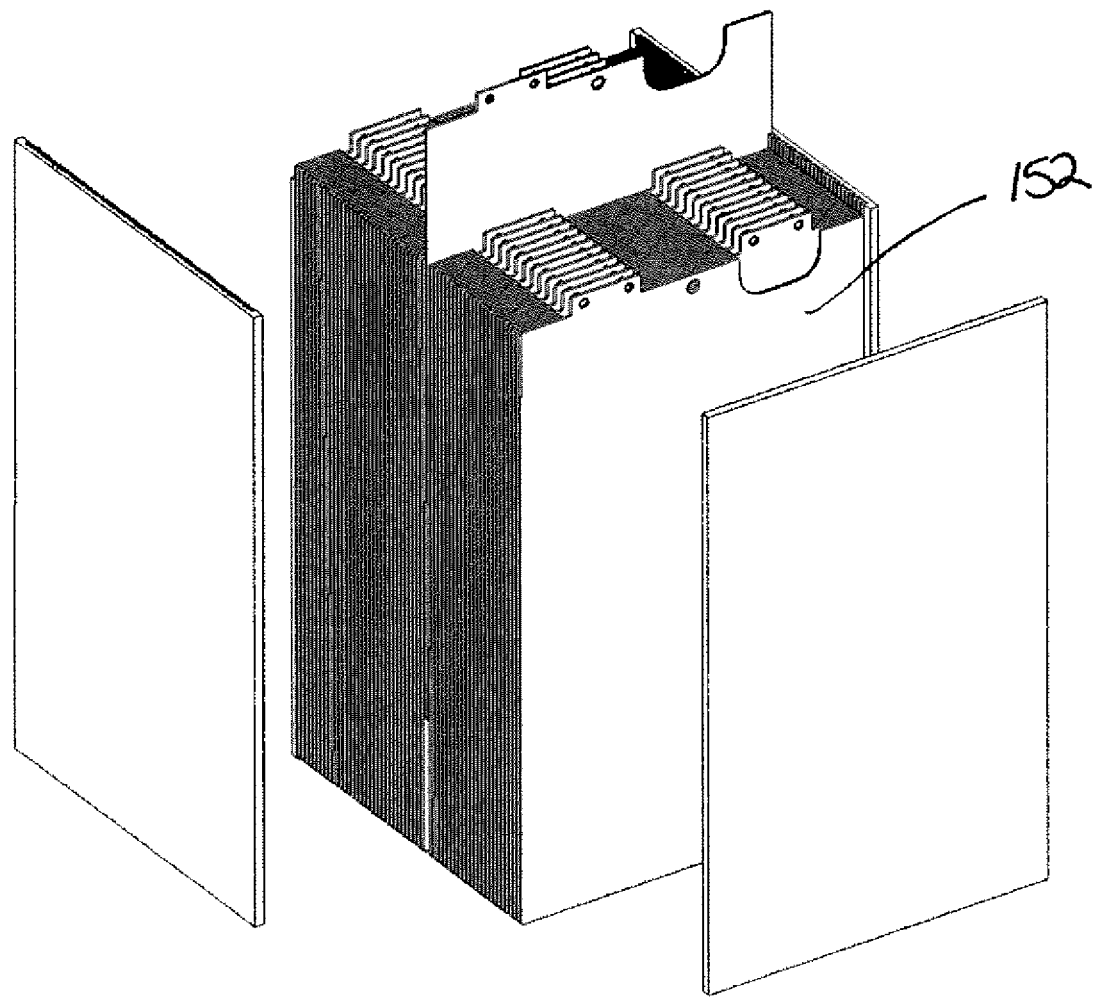
FIG. 7 is a perspective view of a series of electrode plates.

FIG. 7 illustrates an exploded view of a series of parallel spaced electrode plates 152. Each electrode plate 152 can be formed of an electrically conductive material such as carbon steel, aluminum, mixed metal oxide (such as titanium plate with iridium coating) or a combination thereof. In one aspect, the spacing between adjacent electrode plates 152 can be approximately ½" apart. However, in one aspect, the gap size can be alterable from between ½", ⅜", ¼", etc. to allow some configurability of the system depending on what the liquid is to be treated.

Figure 8:
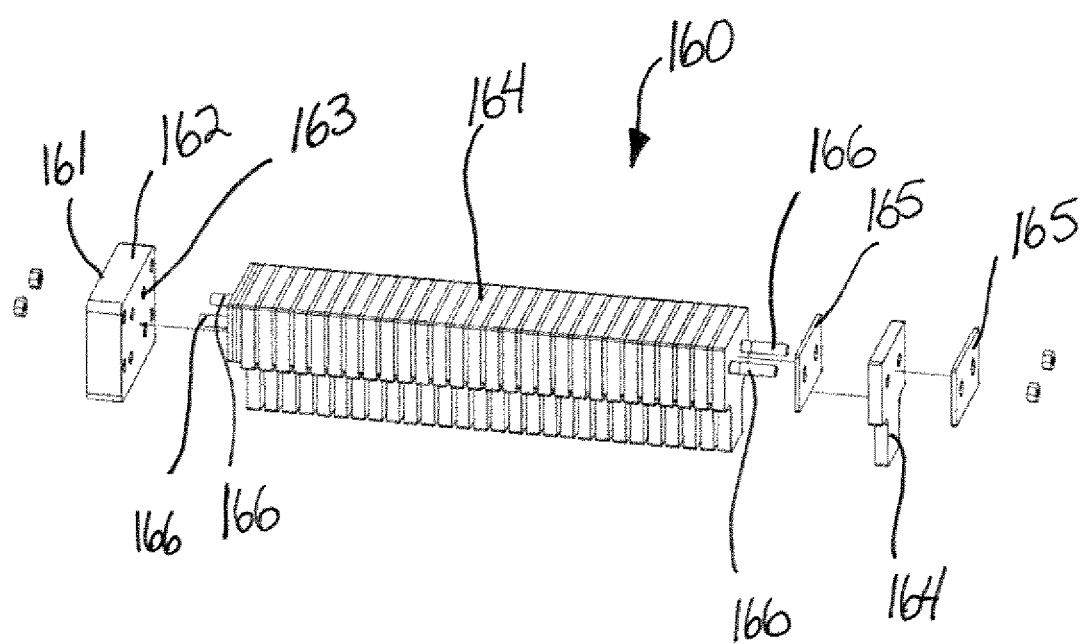
FIG. 8 is a perspective view a bus bar connectable to electrode plates.

FIG. 8 illustrates one of the bus bars 160 connectable between the series of electrode plates 152 and one of the electric conductors 112, 122. The bus bar 160 can have a connection plate 162, a plurality of connectors 164, a plurality of spacers 165 and a pair of support rods 166. The connection plate 162 is connectable on a first side 161 to either the first electric conductor 112 or the second electric conductor 122. The support rods 166 can be connected to and extend from a second side 163 of the connection plate 162. In one aspect, the bus bars 160 can be made of tin-plated copper. The tin plating can be for corrosion protection.

Each connector 164 can be provided on the support rods 166 and connectable to one of the electrode plates 152. The spacers 165 can be provided on the support rods 166 in between the connectors 164 so that the bus bar 160 alternates between a connector 164 and a spacer 165 along the length of the support rods 166. By placing the spacers 165 between adjacent connector 164 on the support rods 166, the spacing of the connectors 164 can be set so that each connector 164 in the bus bar 160 can align with every other electrode plate 152 in the series of electrode plates 152 and then each connector 165 can be connected to the electrode plate 152 it aligns with. In this manner, the bus bar 160 can have every other electrode plate 152 in the series of electrode plates 152 connected to a connector 164 of the bus bar 160 and therefore operably and electrically connected to every other electrode plate 152 to the connection plate 162 on the bus bar 160. By connecting the connection plate 162 to either the first electrical conductor 112 or the second electrical conductor 122, the bus bar 160 can operatively and electrically connect either the first electrical conductor 112 or the second electrical conductor 122 to every other electrode plate 152 in the series of electrode plates 152.

In this manner, a first bus bar 160 can be connected to a first set of electrode plates 152 in the electrode assembly 150 and a second bus bar 160 can be connected to a second set of electrode plates 152 in the electrode assembly 150. If the electrode plates 152 in the first set of electrode plates 152 are alternated with electrode plates 152 in the second set of electrode plate 152, adjacent electrode plates will be connected to different bus bars 160 and therefore a different electrode conductor 112, 122 causing adjacent electrode plates 152 to form anode-cathode pairs.

The second bus bar 160 can be assembled so that the connectors 164 are positioned where the spacers 165 are positioned on the first bus bar 160 and the spacers 165 are positioned where the connectors 164 are positioned on the first bus bar 160. When the connectors 165 of the second bus bar 160 are connected with the electrode plates 152 in the series of electrode plates 152, the electrode plates 152 in the electrode assembly 150 will be alternatively connected to the connection plate 162 of the bus bar 160 to the first electrical conductor 112 or the second electrical conductor 122. In this manner, each adjacent electrode plate 152 in the series of electrode plates 152 will be connected to different bus bars 160.

Spacings between the electrode plates 152 can be altered by changing the thickness of the spacers 165 on the bus bars 160. Using spacers 165 with a greater thickness will increase the size of the gaps between adjacent electrode plates 152 and thinner spacers 165 will decrease the size of the gaps between adjacent electrode plates 152. The size of the gaps between adjacent electrode plates 152 will affect the current density in the separation apparatus 10. The spacers 165 are used to fill the gap between similar electrodes plates 152 (anodes vs. cathodes and if the electrode itself was ¼" plate, 165 would be ¼" copper) and the connectors 164 are used to ensure that the power is adequately distributed from similar electrode plates 152.

The electrode plates 152 can be of varying thickness and length.

This results in a monopolar design with parallel connections, but could be reconfigured to be a bipolar design.

Referring again to FIG. 6, with the bus bars 160 connected to the electrodes plates 152 to form the electrode assembly 150, the electrode assembly 150 can be lowered into the rectangular space 27 created by the insert 25 inside the housing 20 so that the connection plate 162 on the bus bars 160 align with the first electric conductor 112 and the second electric conductor 122.

By putting a voltage across the first electric conductor 112 and the second electric conductor 122, the voltage is passed to the electrode plates 152 with the electrode plates 152 alternatingly and electrically connected to the first electric conductor 112 and the second electric conductor 122 forming a first set of electrode plates 152 operatively connected to the first electrical conductor 112 and a second set of electrode plates 152 operatively connected to the second electrical conductor 122. This causes adjacent electrode plates 152 to act as anode-cathode pairs and create an electric field between adjacent electrode plates 152 in the electrode assembly 150. This can cause a number of things to happen with the liquid being treated. The electrical field created between adjacent electrode plates 152 can cause electrocoagulation to occur in the liquid being treated. Contaminated ions and colloids are held in solution by electrical charges. The electrical field passing through the liquid being treated destabilizes the contaminants in the liquid and can cause chemical reactions and precipitation or coalescence of colloids within the liquid. Electrocoagulation can cause a coagulant to be added to the water being treated, through the dissolution of a sacrificial metal anode. The metal ions that are released form reactive metal hydroxides that act as destabilizing agents and leads to charge neutralization, causing pollutants to coagulate and be removed. Electrocoagulation water treatment however is a much more complex process involving several chemical and physical mechanisms in the aqueous medium. When wastewater are subjected to varying low and high current densities, subsequent variations in size of the coagulated particles are generated, which in turn influences the removal pathway. Electrochemical hydrolysis reactions also create hydrogen and oxygen bubbles at the cathode and anode respectively. These bubbles can float pollutants in a process called electroflotation. Electroflotation can enhance the dissolved air flotation process. Because the interior of the pressurized separation apparatus 10 is kept under pressure, the size of the bubbles formed remain quite small as a result of the elevated pressure maintained in the interior space 22 of the housing 20 of the separation apparatus 10 and only release in treatment processes downstream form the separation apparatus 10. This can further enhance the dissolved air flotation process. Periodically alternating the polarity of the electrode plates 152 can cause any particles that have adhered to the surface of an electrode plate 152 (magnetically attached) to be released from the electrode plate 152 when the polarity is reversed and back into the liquid being treated.

With the electrode assembly 150 installed in the interior space 27 formed by the insert 25 and the bus bars 160 connected to the first electric conductor 112 and the second electric conductor 122, the lid 50 can be closed and sealed to seal the interior 22 of the housing 20.

The first electrical conductor 112 and the second electrical conductor 122 can pass through the first electric conductor inlet 110 and the second electric conductor inlet 120, respectively, in the side of the housing 20 where the first electric conductor inlet 110 can seal around the first electric conductor 112 and the second electric conductor inlet 120 the second electric conductor 122 allowing the interior 22 of the housing 20 to be pressurized without liquid and gases escaping out around the first electrical conductor 112 and the second electrical conductor 122 where they pass through the housing 20 into the interior 22.

In operation, the pressurized separation apparatus 10 can be used to treat municipal, industrial, oil and gas wastewater streams or other liquid similar in nature under pressure. Liquid can be processed through the separation apparatus 10 by pumping the liquid into the housing 20 through the inlet 60 so that the liquid fills the interior space 22 of the housing 22 and fills the spaces in between the electrode plates 152. When the separating apparatus 10 is filled with liquid, the interior 22 of the housing 20 can be pressurized. The interior 22 of the housing 20 can be pressurized to a pressure of 50 psi or above to a maximum pressure rating of the housing 20. However, in one aspect, this would be less than 150 psi. In another aspect, this pressure would be less than 100 psi at 80° C. but above 50 psi. A voltage can be supplied between the first electric conductor 112 and the second electric conductor 122. This will in turn create electrical fields between adjacent electrode plates 152 and through the liquid between the electrode plates 152. In one aspect, this voltage range could be between 0.001 and 16 volts.

The power input can be set so that a desired current density can be applied to the liquid between the electrode plates 152. In one aspect, this current density can range between 0.01 A/sq. in. to 1 A/sq. in. The contaminants in the waste stream and the associated conductivity dictates how much power and gap between electrode plates 152 will be required to treat the liquid.

This electric voltage can be supplied for a period of time to allow the electro-coagulation to work and the contaminants to separate out of the liquid. The elevated pressure can be maintained while the electrical voltages is being supplied.

When the liquid has been treated to destabilize the contaminants, it can be evacuated from the separation apparatus 10 through the outlet 70 and is routed downstream for further treatment.

Figure 9:
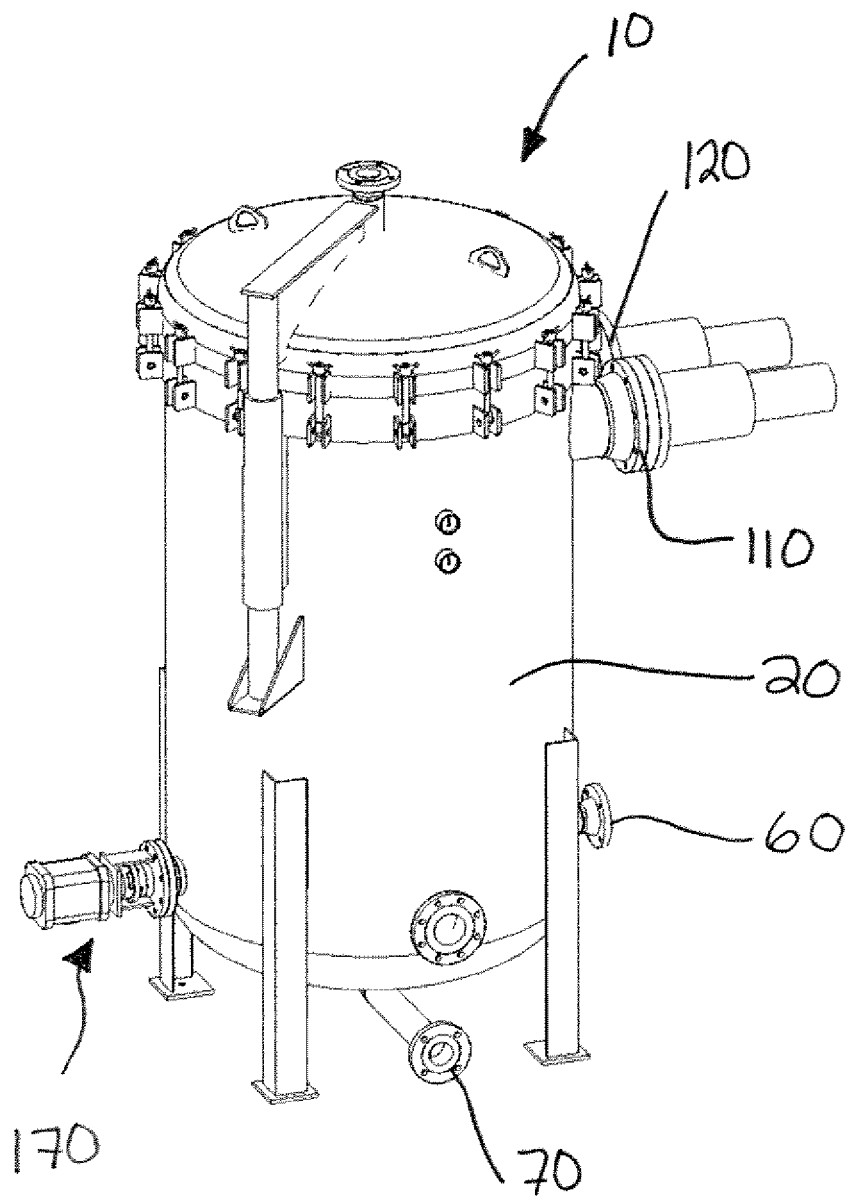
FIG. 9 is a perspective view of an electro-separation apparatus having an autowash assembly.

FIG. 9 illustrates the separation apparatus 10 having an autowash assembly 170 installed in the separation apparatus 10 to wash out sediment and other contaminants that have collected in the gaps between adjacent electrode plates 152. As the separation apparatus 10 is used to treat water, sediment and other contaminants can migrate towards the electrode plates 152. Even if the polarity of these electrode plates 152 is periodically reversed, the sediment and contaminants may still stay attached to the electrode plates. Additionally, the sediment and other contaminants passing downwards through the gaps in the electrode plates 152 as the liquid is being treated can "bridge". This occurs when the sediment and contaminants packs together and forms a mass that stretches between the adjacent electrode plates 152 forming a "bridge". This buildup of sediment can slow or even prevent the liquid being treated from flowing upwards through the gaps between adjacent electrode plates 152 and exiting the separation apparatus 10 thereby negatively affecting the operation of the separation apparatus 10. If liquid being treated cannot flow through the separation apparatus 10, the separation apparatus 10 will underperform. The autowash assembly 170 can spray water or some other cleaning liquid into the gaps between the adjacent electrode plates 152 to wash out and remove any sediment or other contaminants built up in these gaps without having to disassemble or partially disassemble the separation apparatus 10.

Figure 10:
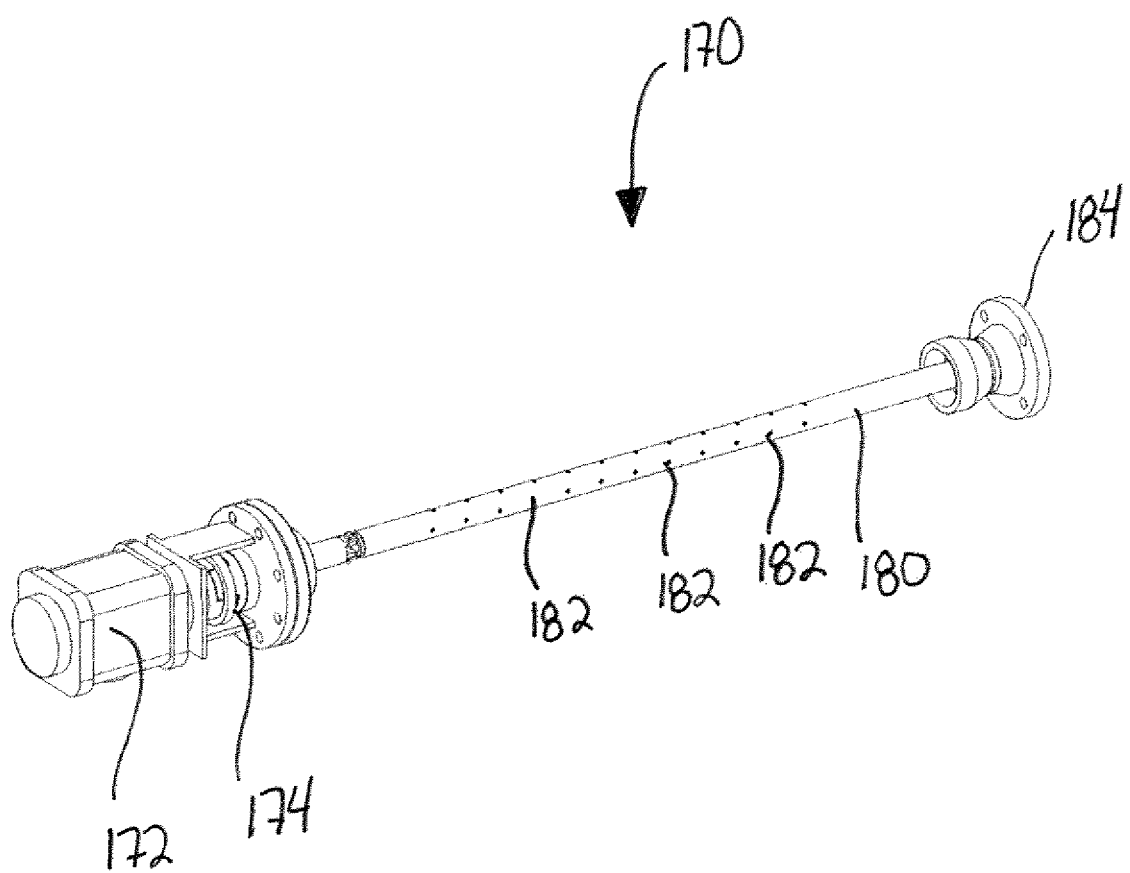
FIG. 10 is a perspective view of an autowash assembly.

Referring to FIG. 10 the autowash assembly 170 can include: a motor 172; a jaw coupler 174; a torque bar 176; a vessel drive flange 178; a wash bar 180 having a plurality of spray nozzles 182; and a vessel inlet flange 184.

The motor 172 can be connected to the torque bar 176 by the jaw coupler 174. In turn, the torque bar 176 can be connected to the wash bar 180 through the vessel drive flange 178. The jaw coupler 174 can operatively connect the motor 172 and the torque bar 176 to transmit rotational motion from the motor 172 to the torque bar 176 and thereby to the wash bar 180; rotating the wash bar 180.

The jaw coupler 174 can be used to transmit torque from the motor 172 while damping vibrations and protecting the components such as the motor 172 if the wash bar 180 gets stuck or jammed while the motor 172 is trying to rotate the wash bar 180.

Figure 11:
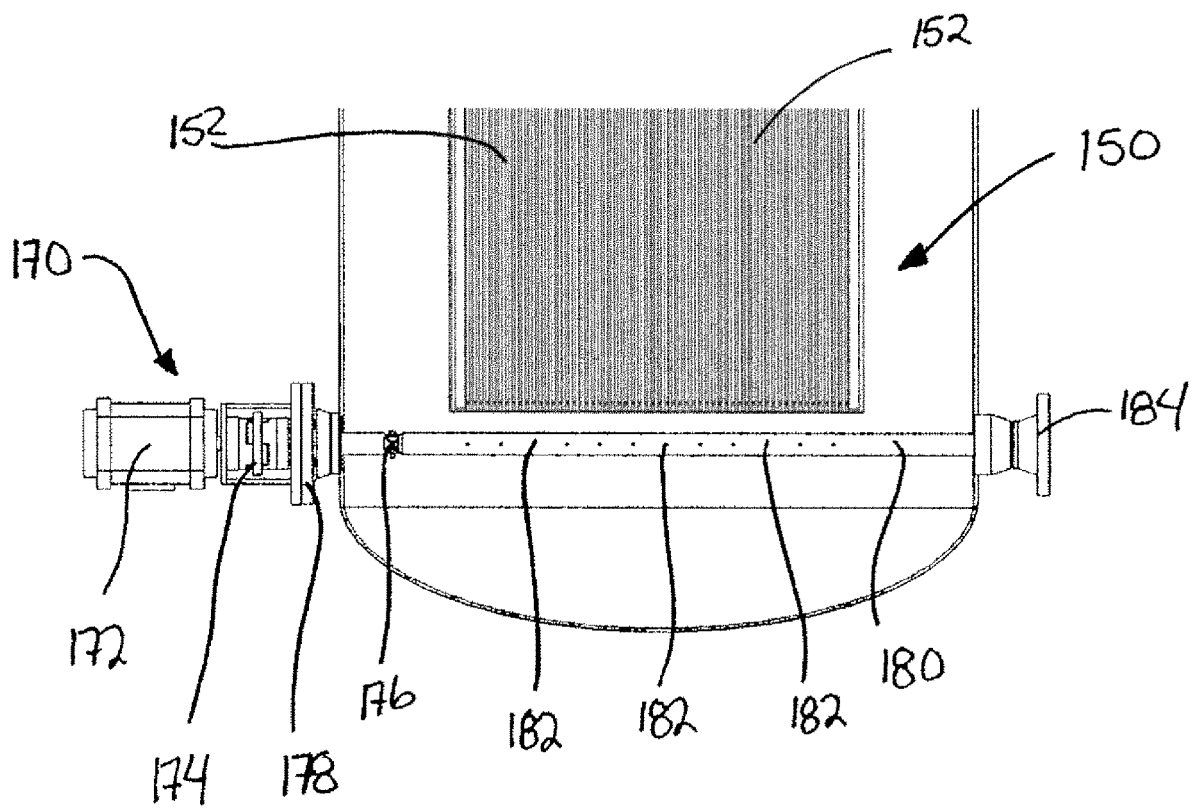
FIG. 11 is side sectional view of the electro-separation assembly and the autowash assembly of FIG. 9.

The spray nozzles 182 can be positioned on the wash bar 180 so that the spray nozzles 182 are aimed into the gaps formed between adjacent electrode plates 152, as shown in FIG. 11. In one aspect, the spray nozzles 182 could be apertures leading into a hollow interior of the wash bar 180 so that pressurized liquid introduced into the hollow interior of the wash bar 180 will be injected as a stream of liquid out of the wash bar 180 through the spray nozzles 182. In this manner, pressurized liquid that is introduced into the vessel inlet flange 184 will be introduced into the interior of the wash bar 180 and through the wash bar 180 out through the spray nozzles 182. This liquid spraying out of the spray nozzles 182 will be sprayed into the gaps between the electrode plates 152 washing out sediment that has collected in the gaps between adjacent electrode plates 152.

The motor 172 can be used to rotate the jaw coupler 174 which will in turn rotate the torque bar 176, the wash bar 180 and the spray nozzles 182 attached to the wash bar 180. The spray nozzles 182 can be positioned relative to the wash bar 180 so that each spray nozzle 182 will rotate in a plane when the wash bar 180 is rotated by the motor 172 and each plane will be parallel to the electrode plates 152 and pass through the gap between a pair of adjacent electrode plates 152. In this manner, when the motor 172 is used to rotate the wash bar 180 each spray nozzle 182 will rotate through a plane passing through a gap between a pair of adjacent electrode plates 152 and spray water or other liquid into the gap to wash out any sediment or other contaminants that have collected in the gap. A cleaning liquid such as clean water can be introduced into the autowash assembly 170 through the vessel inlet flange 180 to be sprayed between the electrode plates 152. This can be done when the separation apparatus 10 has been drained of liquid being treated or it may be done while liquid to be treated is still inside the separation apparatus 10.

Figure 12:
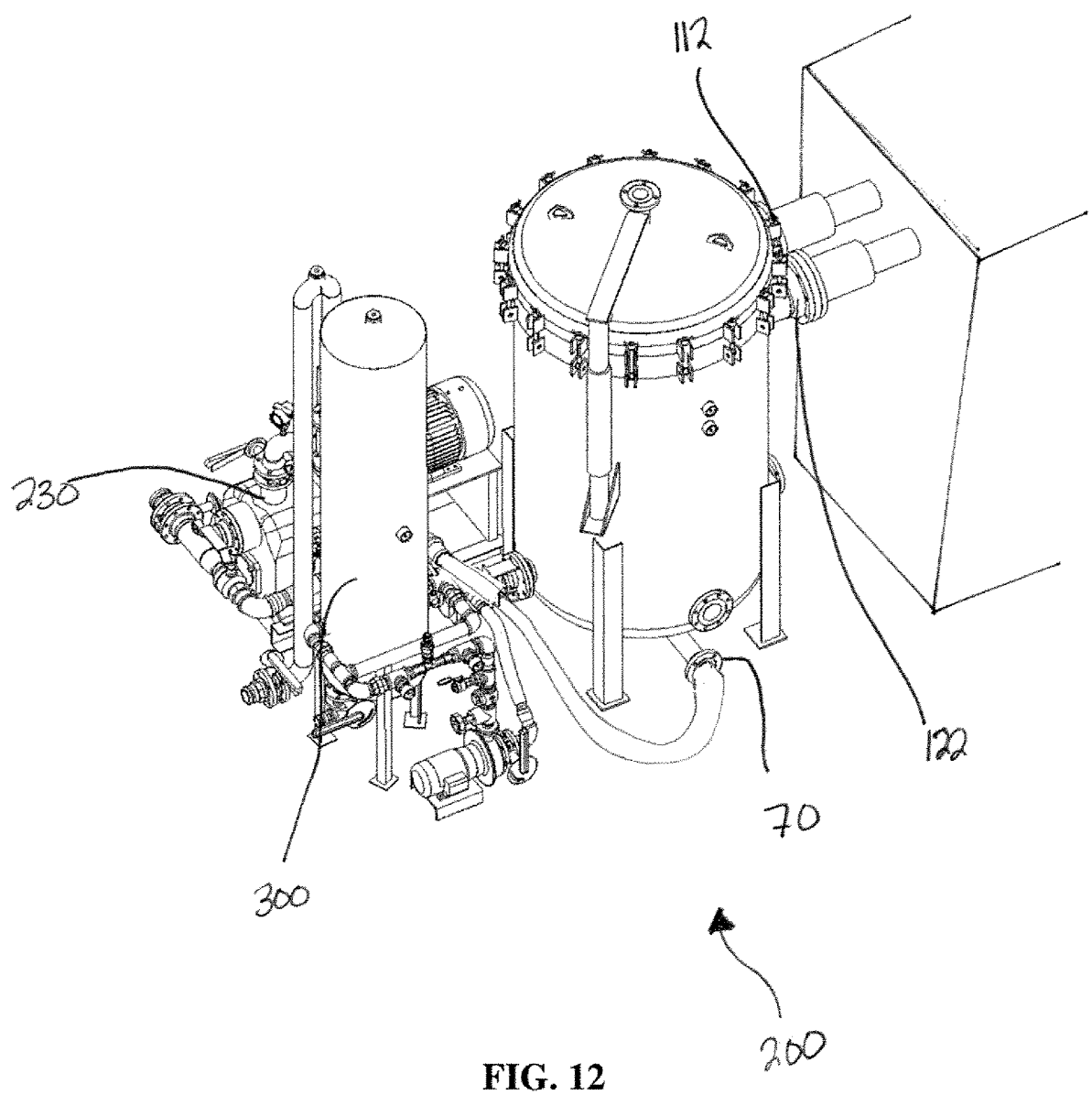
FIG. 12 is a perspective view of a treatment system incorporating the electro-separation apparatus of FIG. 1 and a cyclonic reactor.
Figure 13:
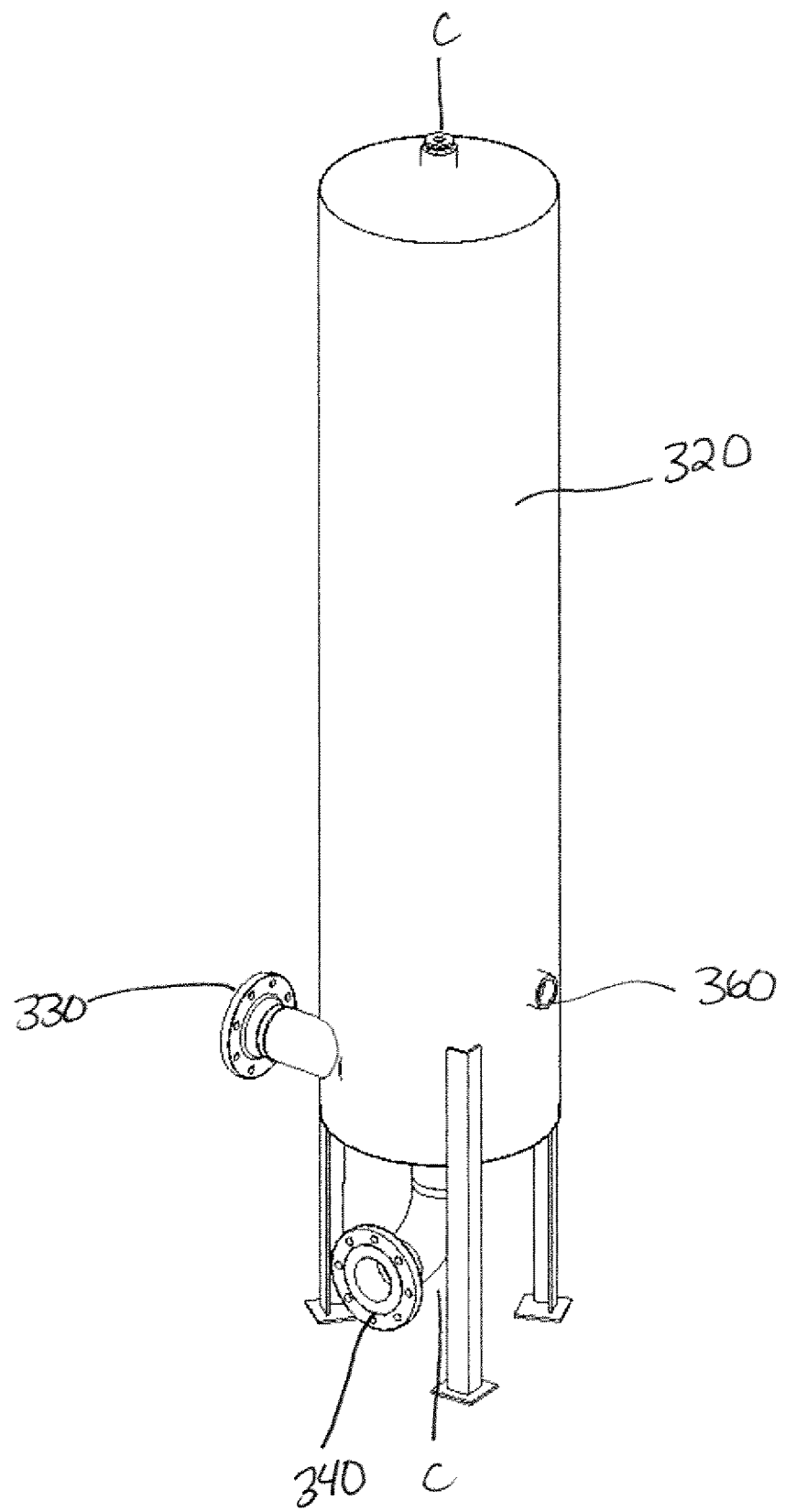
FIG. 13 is a perspective view of the cyclonic reactor.
Figure 14:
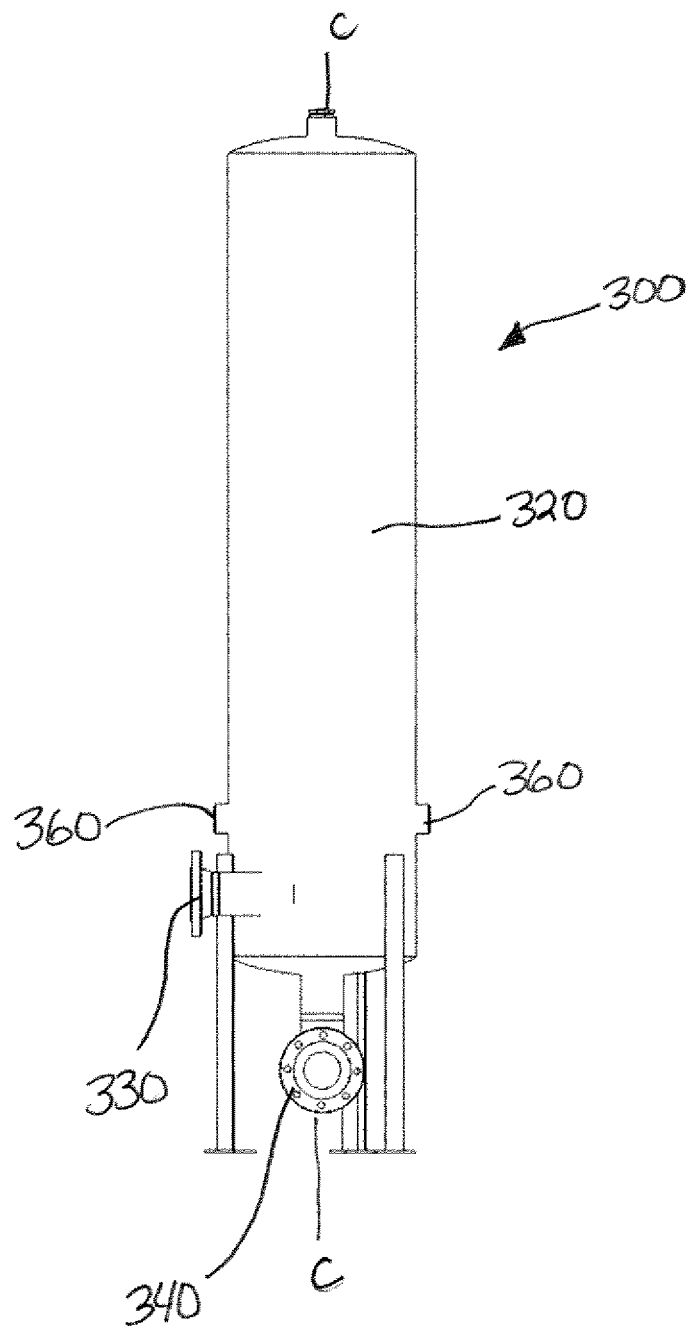
FIG. 14 is a side view of the cyclonic reactor of FIG. 13.
Figure 15:
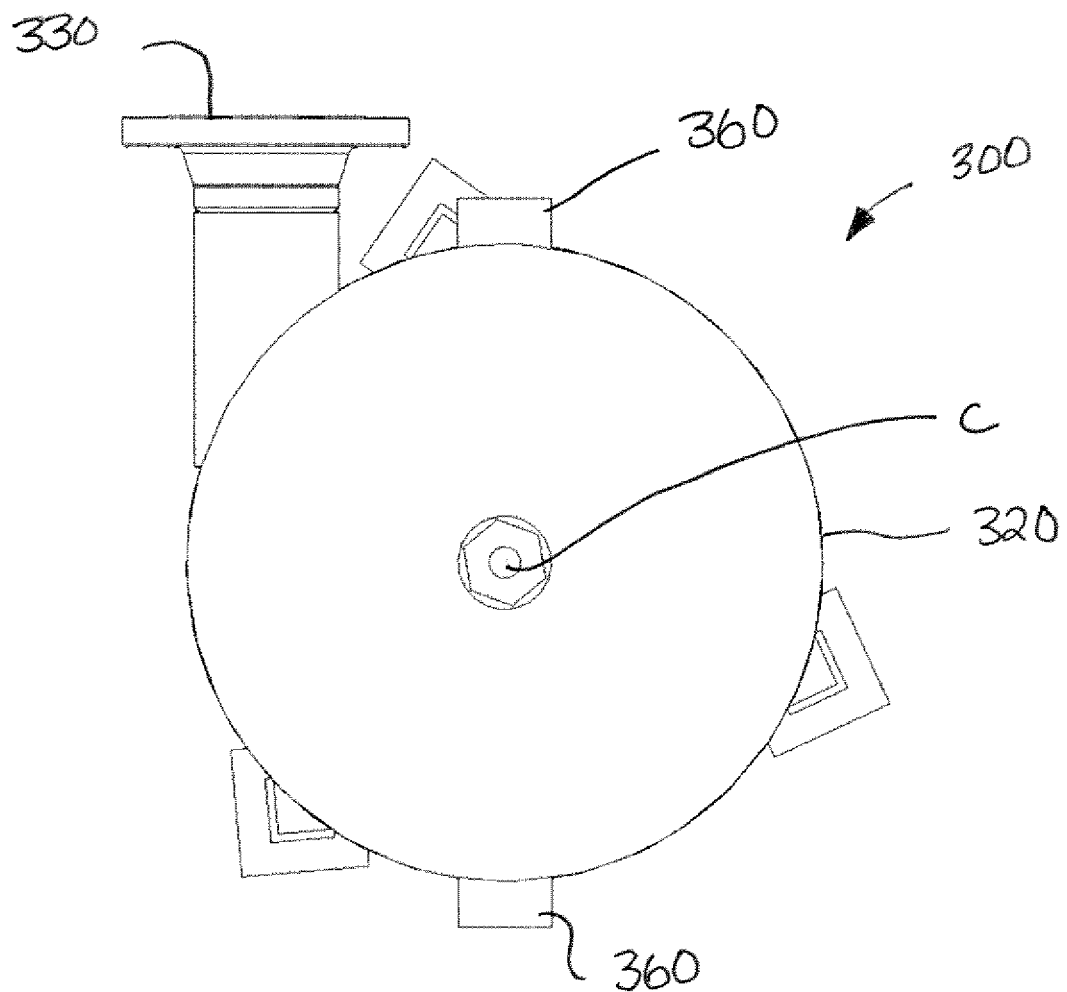
FIG. 15 is a top view of the cyclonic reactor of FIG. 13.

Referring to FIG. 12, the pressurized separation apparatus 10 can be part of a treatment system 200 that also includes a cyclonic advanced oxidation reactor 300, to further separate sediment and other contaminants from the liquid after it has passed through the pressurized separation apparatus 10, and a power supply 220 to supply a voltage across the first electrical conductor 112 and the second electrical conductor 122 used in the pressurized separation apparatus 10.

The power supply 220 can be sized based on the size of the separation apparatus 10 and the current densities desired. For example, in one aspect, the separation apparatus 10 may be as large as 96" in diameter and may require a 40,000 A power supply to achieve the desired current density range.

After the liquid exits the pressurized separation apparatus 10 from the outlet 70, the treated liquid while remaining under pressure can be routed into the cyclonic reactor 300 for further treatment.

FIGS. 13-16 shows a cyclonic reactor 300 that can be used to further treat the liquid that has already been treated in the pressurized separation apparatus 10. Ozone is introduced into the liquid in the cyclonic reactor 300. Ozone has the ability to oxidize contaminants. Ozone molecules can react with a substrate (direct pathway) or with hydroxide ions or radicals (indirect pathway). The pathway to oxidation depends on the reaction rate of the ozone and substrate, and the reaction products that may promote or inhibit ozone decomposition. This oxidation efficiency is also dependent on the properties of the waste stream, such as pH, alkalinity, temperature, and organic matter. Oxidation by way of ozone happens almost immediately at the point where ozone is injected into the liquid in the cyclonic reactor 300 and continues as the commingled ozone-liquid stream moves through the cyclonic reactor 300. The cyclonic reactor 300 can have a housing 320, an inlet 330, an outlet 340 and a conduit 350. The housing 320 can extend vertically and be cylindrical in shape. The inlet 330 can be provided near the bottom of the housing 320 with the inlet 330 directing the incoming stream of liquid generally horizontally and to one side of a vertical central axis, C, of the cyclonic reactor 300. This offsetting of the inlet 330 to one side of the central axis, C, will cause a flow of liquid into the housing 320 of the cyclonic reactor 300 to swirl around inside the housing 320 following the shape of the housing 320 and increasing the contact of the ozone and the contaminants in the liquid.

The outlet 340 can be provided in a bottom of the housing 320.

Ozone ports 360 can be provided to allow ozone to be injected into the interior space of the housing 320 through these ozone ports 360. In one aspect, the ozone ports 360 are provided close to the inlet 330 so that ozone can be introduced into the liquid shortly after it is introduced into the housing 320 to get the liquid and the ozone to intermingle as soon as possible and achieve the longest time period in which the ozone is reacting with the contaminants in the liquid as the liquid moves through the housing 320 of the cyclonic reactor 300.

Figure 16:
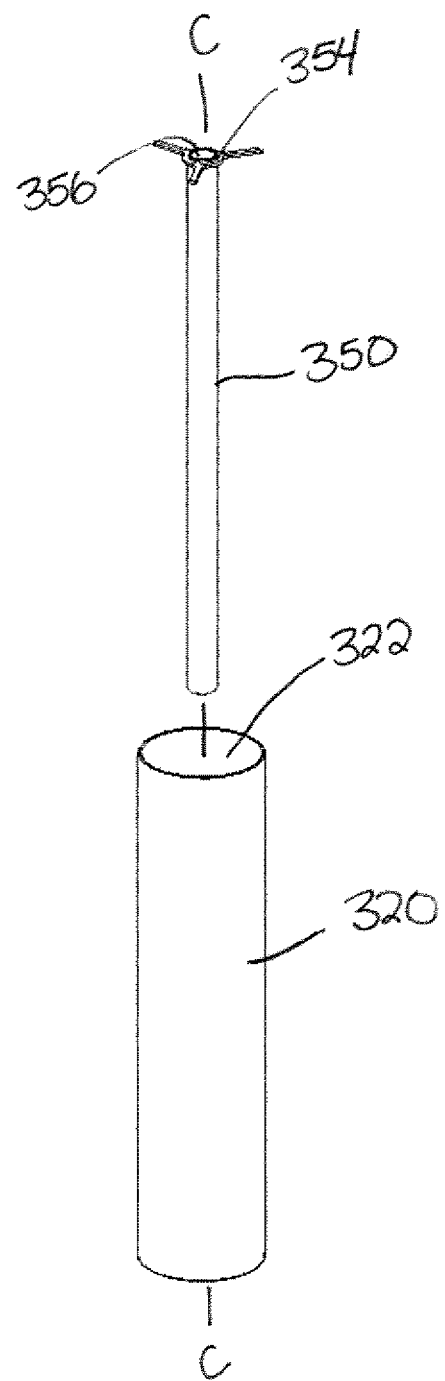
FIG. 16 is a explode view of the cyclonic reactor of FIG. 13.

Referring to FIG. 16, a conduit 350 can be provided extending vertically in the interior 322 of the housing 320 and connected at a bottom end 352 of the conduit 350 to the outlet 340 of the cyclonic reactor 300. The conduit 350 can have an opening 356 at a top end 354 of the conduit 350. In this manner, liquid that is introduced into the cyclonic reactor 300 through the inlet 330 will swirl around the interior 322 of the housing 320 from the inlet 330 provided near the bottom of the housing 320 upwards inside the interior 322 of the housing 320 and into the opening 356 provided in the top end 354 of the conduit 350 where it can enter the conduit 350. Once the liquid is inside the conduit 350, it will travel down the conduit 350 and out of the cyclonic reactor 300 through the outlet 340. Because the bottom end 352 of the conduit 350 is connected to the outlet 340 of the cyclonic reactor 300, the liquid must pass through the conduit 350 before it can exit the cyclonic reactor 300 and therefore it must rise inside the interior 322 of the housing 320 until it can enter the conduit 350 through the opening 356.

In operation, a flow of liquid that has been treated in the pressurized separation apparatus 10 can be directed into the inlet 330 of the cyclonic reactor 300. Ozone can be injected into this liquid through the ozone ports 360 at or near where the inlet 330 introduces it to the interior 322 of the cyclonic reactor 300. This flow of liquid and ozone inside the cyclonic reactor 300 will be induced to swirl inside the interior 322 of the housing 320 of the cyclonic reactor 300 because of the positioning of the inlet 330. This liquid and ozone mixture will swirl around the interior 322 of the housing 320 as it moves upwards inside the housing 320 to the top end 354 of the conduit 350. At the top end of the housing 320, it will enter the opening 354 there before traveling downwards inside the conduit 350 to the outlet 340 of the cyclonic reactor 300 where it will be removed from the cyclonic reactor 300.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A method comprising:
   providing a separation apparatus comprising:
      a housing defining an interior space; and
      an electrode assembly provided in the interior space, the electrode assembly having a plurality of electrode plates;
   routing liquid containing contaminants into the interior space of the housing of the separation apparatus;
   increasing the pressure in the interior space of the housing to between 50 psi and 80 psi and supplying a voltage across adjacent electrode plates; and
   supplying the voltage for a period of time while maintaining the pressure in the liquid between 50 psi and 80 psi to allow the contaminants in the liquid to destabilize.

2. The method of claim 1 further comprising providing an autowash assembly in the housing and using the autowash assembly to spray a cleaning liquid between adjacent electrode plates of the electrode assembly, wherein the autowash assembly comprises a plurality of spray nozzles operative to direct a flow of liquid from the autowash assembly into gaps formed between adjacent electrode plates of the electrode assembly.

3. The method of claim 2 wherein the autowash assembly is used when the housing contains liquid to be treated.

4. The method of claim 2 wherein the autowash assembly is used when the housing is drained of liquid to be treated.

\* \* \* \* \*